United States Patent
Kim et al.

[11] Patent Number: 5,943,627
[45] Date of Patent: Aug. 24, 1999

[54] MOBILE CELLULAR PHONE

[76] Inventors: Seong-Soo Kim, Pureunmaeul Apartment 109-606, 4/7, 719, Ilwon-dong, Kangnam-ku, Seoul; Chi-Man Park, 706, Mijeon-ri, Chubu-Meon, Keumsan-kun, Chungcheongnam-do, both of Rep. of Korea

[21] Appl. No.: 08/801,354

[22] Filed: Feb. 18, 1997

[30] Foreign Application Priority Data

Sep. 12, 1996 [KR] Rep. of Korea ............... 96-39516
Nov. 11, 1996 [KR] Rep. of Korea ............... 96-39398

[51] Int. Cl.$^6$ ............... H04B 7/15; H04B 1/38; H04B 1/00; H04M 1/00
[52] U.S. Cl. ............... 455/569; 455/11.1; 455/550; 455/568; 379/426; 379/430
[58] Field of Search ............... 455/569, 568, 455/550, 90, 575, 404, 555, 509, 402, 13.1, 11.1; 379/420, 426, 428, 430, 432; 381/388, 386, 374, 380, 324, 327, 330, 375, 381; D14/137, 138, 147, 202; 543/720, 721; 370/430; 244/929, 930

[56] References Cited

U.S. PATENT DOCUMENTS

5,377,256 12/1994 Franklin et al. ............... 455/404
5,677,948 10/1997 Meister ............... 379/142
5,771,438 6/1998 Palermo et al. ............... 455/11.1

Primary Examiner—Dwayne D. Bost
Assistant Examiner—Raymond Bernardo Persino
Attorney, Agent, or Firm—Majestic, Parsons, Siebert & Hsue P.C.

[57] ABSTRACT

The present invention relates to a mobile cellular phone, the mobile cellular phone including: a radio handset and a mobile cellular phone body for transmitting and receiving a sound and a signal information through a wireless channel; and a holder disposed in the body for accommodating the radio handset so that when the radio handset is detached from the holder the body can relay the sound and the signal information between the radio handset and a base station to thereby enable a telecommunication to be realized through the radio handset and when the radio handset is accommodated in the holder, the telecommunication can be realized through the body.

22 Claims, 9 Drawing Sheets

MOBILE CELLULAR PHONE

BACKGROUND OF THE INVENTION

1. Field of the Invention

The present invention relates to a mobile cellular phone, and more particularly to a mobile cellular phone for telecommunication via a mobile cellular phone body when a radio handset is attached to the body thereof and for telecommunication via the radio handset when it is detached therefrom. The present invention thus described can be applied to a mobile cellular phone as well as to a walkie-talkie.

2. Description of the Prior Art

Generally, with a popular use of a mobile cellular phone, business used be conducted at an office of a predetermined address can be easily carried out in a running vehicle or on foot.

However, new dangers are encountered in various fields in forms of byproducts accompanying to changing business environments.

By way of example, in case a driver wants to communicate while a vehicle is running, the driver puts one hand on the steering wheel while he or she holds and puts a handset to an ear until a guide signal is heard from a base station, which entails an accident.

Furthermore, there is a problem in that a user can be exposed for a long time to harmful electromagnetic waves generated from a mobile cellular phone to thereby derange brain waves according to thermal energy of microwaves.

In order to cope with the aforementioned problem, there is provided a hands-free mobile cellular phone. The hands-free mobile cellular phone thus developed and constructed to be installed in a vehicle is such that a user utilizes a speakerphone off a body thereof at a predetermined distance, and listens to the sound to communicate.

However, there is another problem in that the hands-free mobile cellular phone loses its hands-free function once it is hooked off the vehicle.

There is still another problem in that when the hands-free mobile cellular phone is used at a place where ambient noises abound, telephone conversation messages cannot be accurately communicated.

SUMMARY OF THE INVENTION

The present invention is provided to solve the aforementioned problems, and it is an object of the present invention to provide a mobile cellular phone by which a telecommunication can be done hands-free and contents thereof can be more accurately transmitted.

It is another object of the present invention to provide a mobile cellular phone by which a telecommunication can be possible with an earphone inserted into an ear and without a handset being adhered to an ear, so that the harmful electromagnetic waves generated from the mobile cellular phone are prevented from directly reaching a user.

In accordance with the objects of the present invention, there is provided a mobile cellular phone, the mobile cellular phone comprising: a radio handset and a mobile cellular phone body for transmitting and receiving a sound and a signal information through a wireless channel; and a holder disposed in the body for accommodating the radio handset, so that, when the radio handset is detached from the holder, the body can relay the sound and the signal information between the radio handset and a base station to thereby enable a telecommunication to be realized through the radio handset, and when the radio handset is accommodated in the holder, the telecommunication can be realized through the body. The radio handset can also be worn by a user to be used in hands-free state.

BRIEF DESCRIPTION OF THE DRAWINGS

For fuller understanding of the nature and objects of the invention, reference should be made to the following detailed description taken in conjunction with the accompanying drawings in which:

FIG. 3 is a side view of a radio handset according to the first embodiment of the present invention where the antenna is tucked in:

DETAILED DESCRIPTION OF THE INVENTION

Now, preferred embodiments of the present invention will be described with reference to the accompanying drawings.

Figure 1A:
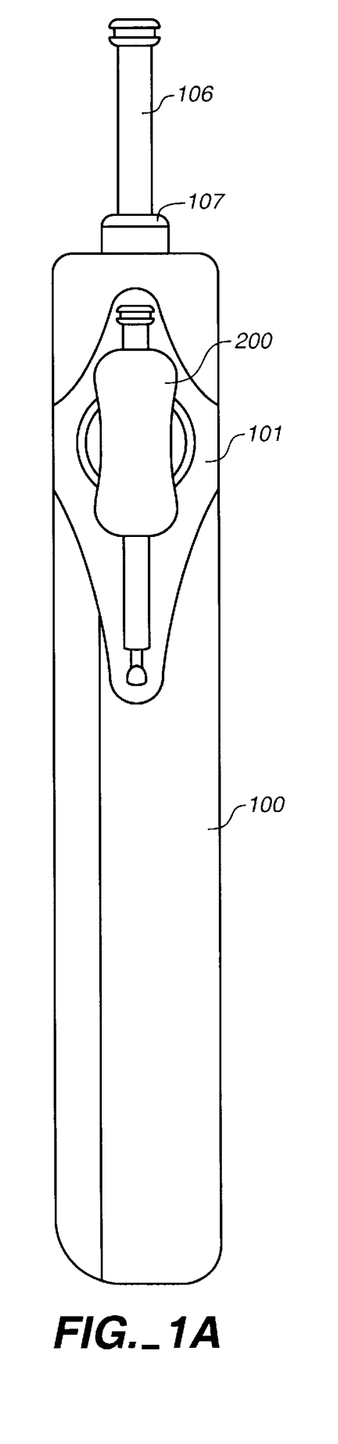
FIG. 1A is a side view of a mobile cellular phone according to a first embodiment of the present invention.
Figure 1B:
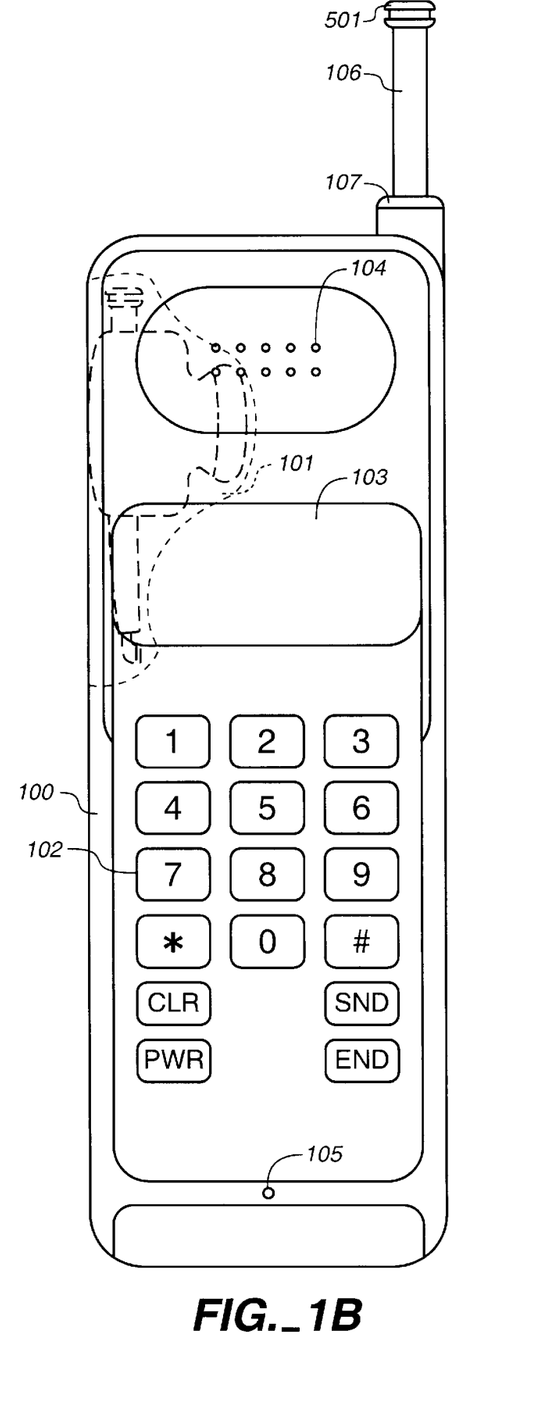
FIG. 1B is a plan of a mobile cellular phone according to the first embodiment of the present invention.

FIG. 1A is a side view of a mobile cellular phone according to a first embodiment of the present invention and FIG. 1B is a plan of a mobile cellular phone according to the first embodiment of the present invention, wherein the mobile cellular phone according to the first embodiment includes a radio handset 200 and a mobile cellular phone body 100 (hereinafter referred to as body) formed with a holder 101 for accommodating the radio handset 200.

When the radio handset 200 is detached from the holder 101, the body 100 serves to relay a voice sound and a signal information between the radio handset 200 and a base station via a radio channel to thereby enable a telecommunication, and when the radio handset 200 is accommodated in the holder 200, the telecommunication can be possible by way of the body 100.

Furthermore, the body 100 is equipped with an antenna 106 which is in turn disposed with a light emitting diode 107 at a lower housing thereof and a light emitting body 501 at an upper end thereof.

In FIGS. 1A and 1B, reference numeral 102 is a key pad, 103 is a displayer, 104 is a speaker and 105 is a microphone.

Figure 2:
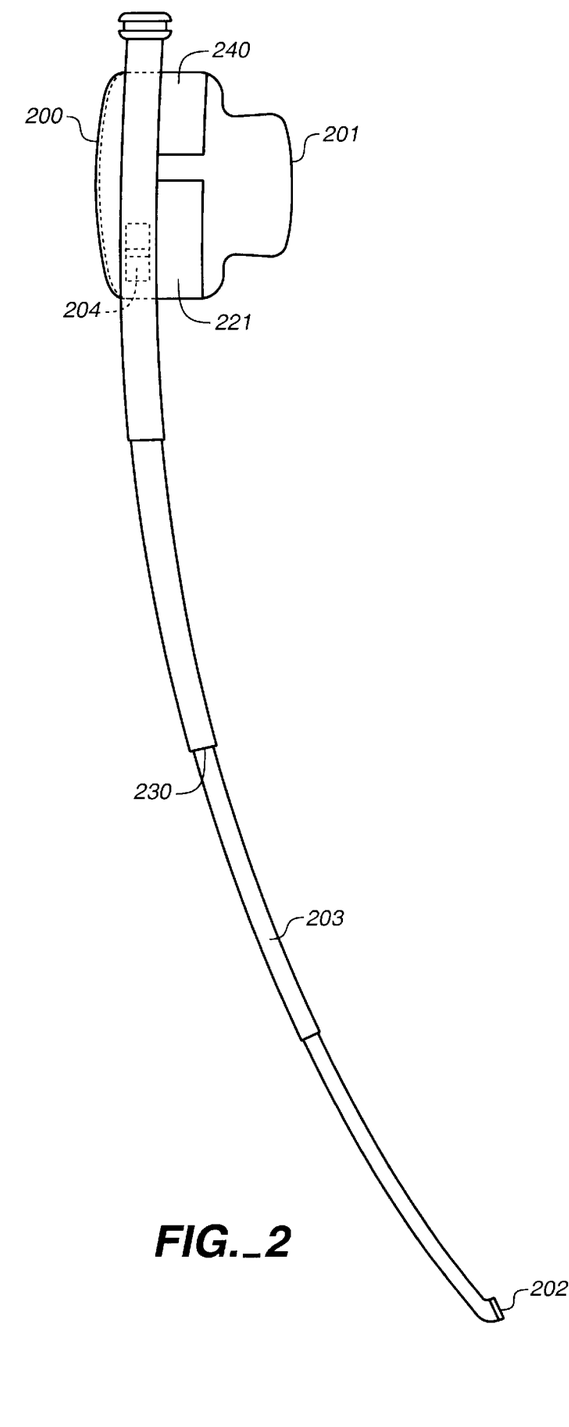
FIG. 2 is a side view of a radio handset according to the first embodiment of the present invention where an antenna is unfolded.
Figure 3:
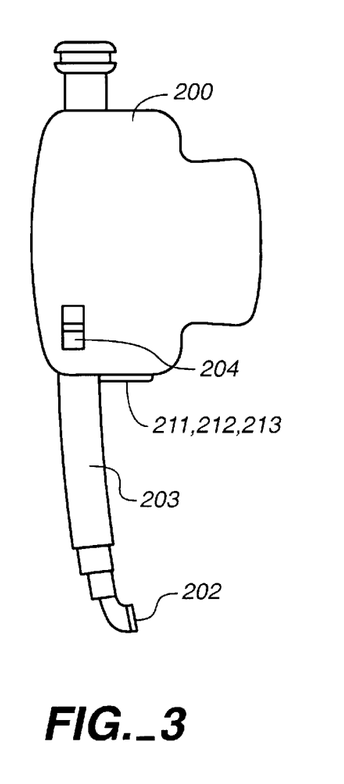

FIG. 2 is a side view of a radio handset where an antenna is unfolded at the mobile cellular phone according to the first embodiment of the present invention, and FIG. 3 is a side view of a radio handset where the antenna is tucked in at the mobile cellular phone according to the first embodiment of the present invention.

The radio handset 200 includes an earphone 201 to be tucked into an ear of a user, a zoom microphone 202 for inputting the user's voice sound and an antenna 203 having one end thereof connected to the earphone 201 and the other end thereof connected to the microphone 202.

The earphone 201 includes a microphone switch 204 for manipulating the radio handset 200 to a stand-by state or an engaged state thereof, a tranceiver (not shown) for receiving via the antenna 203 a voice sound and a signal information transmitted from the body 100 through a radio channel to thereby output same, and for transmitting to the body 100 via the antenna 203 the sound information input through the zoom microphone 202, a control apparatus 240 for controlling an operation of the radio handset 200 and a power source apparatus 220 for supplying a power needed for driving the radio handset 200.

Furthermore, the antenna 203 is provided with a touch switch 230 which is turned off when the antenna 203 is tucked in to only maintain a receiving function of the radio handset 200 and to thereby enable the telecommunication via the body 100.

Figure 4:
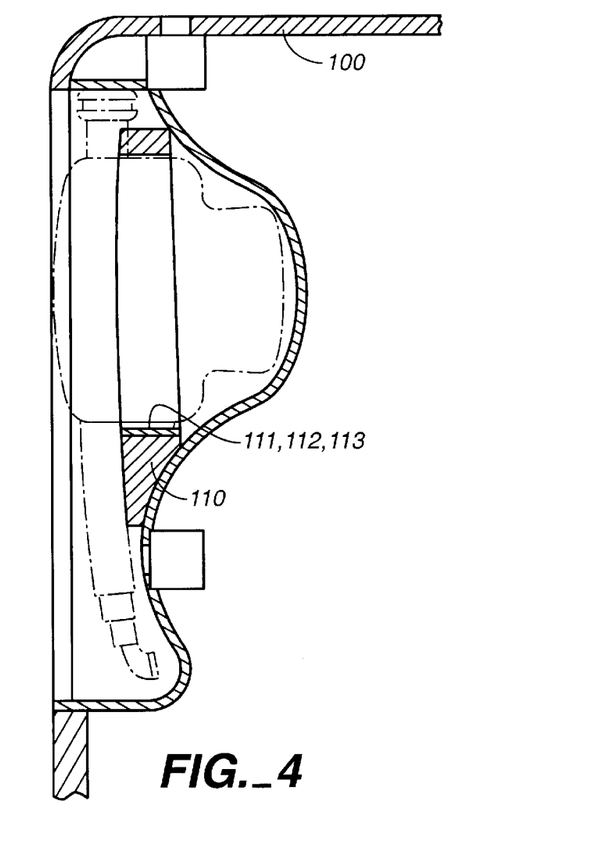
FIG. 4 is a detailed drawing of a radio handset holder according to the first embodiment of the present invention where the holder is disposed in a mobile cellular phone body.
Figure 5:
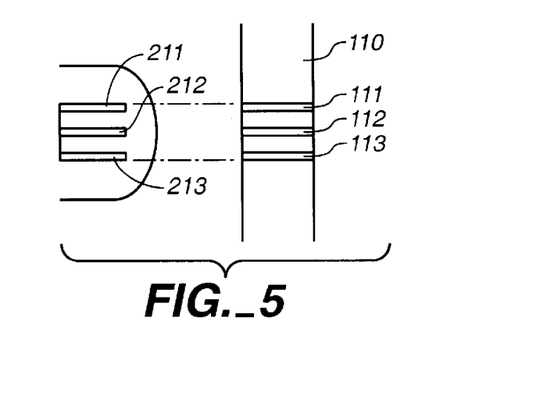
FIG. 5 is a schematic diagram for illustrating connecting terminals at the radio handset holder and a radio handset in a mobile cellular phone according to the first embodiment of the present invention.

Meanwhile, FIG. 4 is a detailed drawing of the holder formed at the body in the mobile cellular phone according to the first embodiment of the present invention and FIG. 5 is a schematic diagram of terminals at the holder and the radio handset in the mobile cellular phone according to the first embodiment of the present invention, wherein the holder 101 for accommodating the radio handset 200 is a ring-type clip 110 disposed at the body 100.

The ring-type clip 110 is respectively formed with a power source terminal 111, a control terminal 112 and a ground terminal 113, where, when the radio handset 200 is inserted into the ring-type clip 110, a power source terminal 211, a control terminal 212 and a ground terminal 213 externally formed at the earphone 201 of the radio handset 200 are respectively connected to the power source terminal 111, the control terminal 112 and the ground terminal 113 formed at the ring-type clip 110.

In other words, the ring-type clip 110 and the power terminals 111 and 211, control terminals 112 and 212, and the ground terminals 113 and 213 at the radio handset 200 are short-circuited when the radio handset 200 is inserted into the holder 101, and are opened when the radio handset 200 is detached from the holder 101.

Figure 6A:
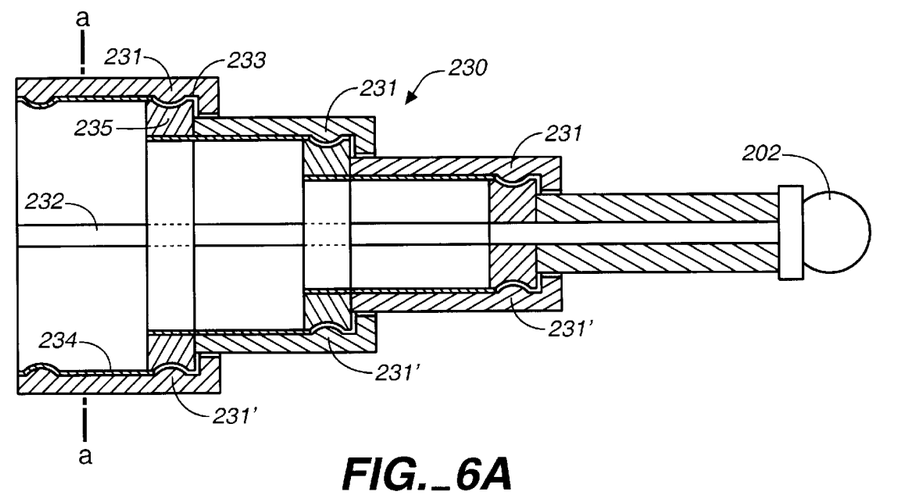
FIG. 6A is a schematic diagram of a touch switch in a radio handset of a mobile cellular phone according to the first embodiment of the present invention.
Figure 6B:
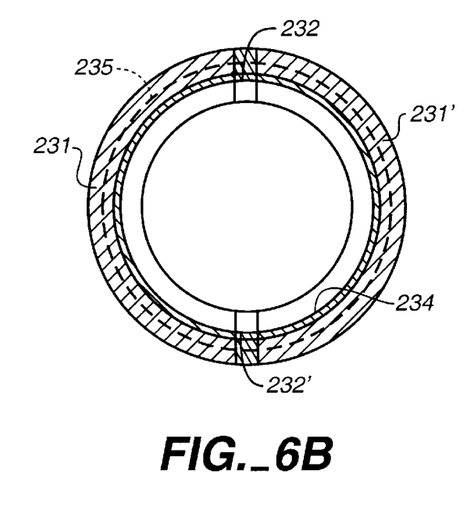
FIG. 6B is a sectional view taken along line a–a' in FIG. 6A.
Figure 6C:
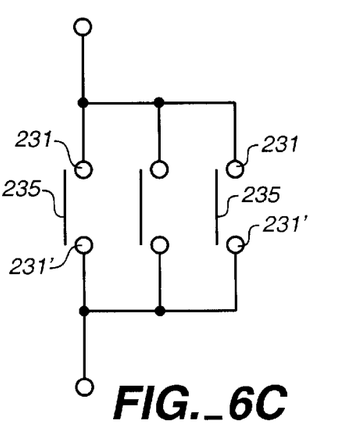
FIG. 6C is an equivalent circuit diagram of the touch switch illustrated in FIG. 6A.

FIG. 6A is a schematic diagram of a touch switch of the radio handset in the mobile cellular phone according to the first embodiment of the present invention and FIG. 6B is a sectional view taken along line a–a' in FIG. 6A and FIG. 6C is an equivalent circuit diagram of the touch switch illustrated in FIG. 6A.

As illustrated in FIGS. 6A and 6B, the touch switch 230 is formed at the extendable antenna 203 connected by a plurality of slidable tubular members, where respective tubular members of the antenna 203 are constructed such that two electric conductors 231 and 231' are connected by electric insulators 232 and 232', and inner peripheries of respective tubular members except for switching portions 233 are covered by electrically insulated coating film 234.

When the antenna 203 is extended, electrically conductive ring 235 comes to contact the switching portion 233 to thereby cause the two electric conductors 231 and 231' to be electrically connected because the electrically conductive ring 235 tangent to respective switching portions 233 is formed at respective tubular members, and when the antenna 203 is tucked in, the electrically conductive ring 235 becomes detached from the switching portion 233 to thereby cause the two electric conductors 231 and 231' to be opened electrically.

In other words, the touch switch 230 formed at the antenna 203 thus constructed includes a plurality of switches connected in parallel an illustrated in FIG. 6C.

Figure 7:
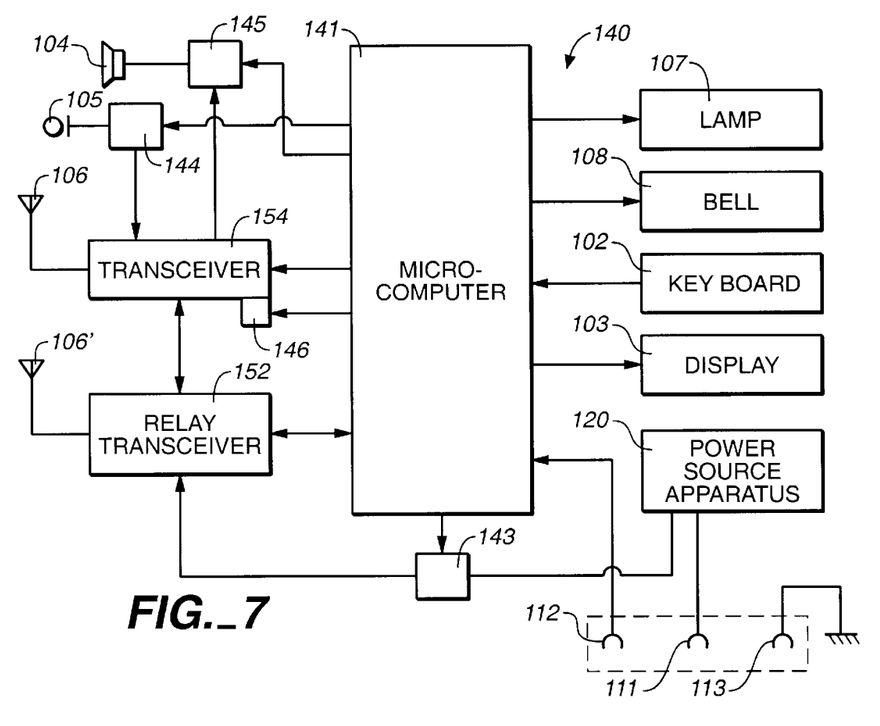
FIG. 7 is a schematic block diagram of a mobile cellular phone body in a mobile cellular phone according to the first embodiment of the present invention.

Meanwhile, FIG. 7 is a schematic block diagram of the body 100 in the mobile cellular phone according to the first embodiment of the present invention, wherein the body 100 includes a key pad 102, a display 103, a speaker 104, a microphone 105, antennas 106 and 106', a lamp 107, a bell 108, a power source apparatus 120, a control apparatus 140, a relay transceiver 152 and a transceiver 154.

The control apparatus 140 is employed by a microcomputer 141, a switch 143, a microphone switch 144, a speaker switch 145 and a hook switch 146, The microcomputer 141 serves to control the display 103, the light emitting lamp 107, the bell 08, the microphone switch 144, the speaker switch 145, the hook switch 146 and the transceiver 154, so that the switch 143 can be turned off while the control terminal 112 is turned on to thereby control the relay transceiver 152 in a stop state and simultaneously to enable to telecommunicate via the speaker 104 and the microphone 105 at the body 100.

Furthermore, microcomputer 141 serves to turn on the switch 143 while the control terminal 112 is turned off and to drive the relay transceiver 152 to thereby enable a telecommunication via the radio handset 100, and simultaneously to control in such a way that the microphone switch 144 and the speaker switch 145 are turned off to disable a telecommunication from being realized via the body 100.

The microcomputer 141 serves to control a telecommunicating state according to various control signals provided from the radio handset 200 through the antenna 106' and the relay transceiver 152.

Figure 8:
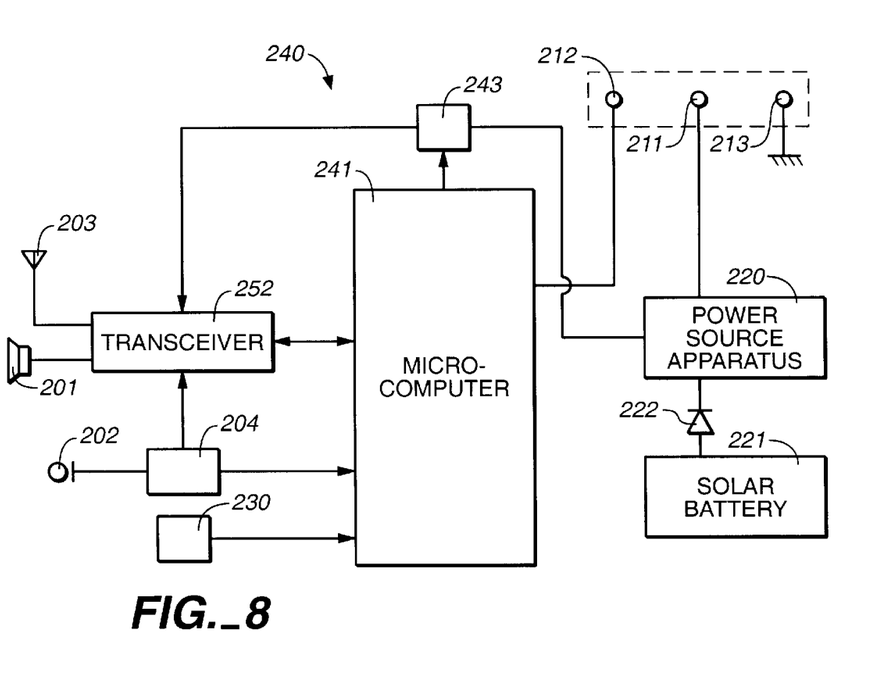
FIG. 8 is a schematic block diagram of a radio handset in a mobile cellular phone according to the first embodiment of the present invention.

FIG. 8 is a schematic block diagram of the radio handset 200 in the mobile cellular phone according to the first embodiment of the present invention, wherein the radio handset 200 is provided with an earphone 201, a microphone 202, an antenna 203, a power source apparatus 220, a solar battery 221, a diode 222, a touch switch 230, a control apparatus 240 and a transceiver 252.

The control apparatus 240 is mounted with a microphone switch 204, a microcomputer 241 and a switch 243.

The microcomputer 241 is adapted to turn on the switch 243 while the control terminal 212 is turned off to thereby drive the transceiver 252 so that a sound received at the transceiver 252 from the body 100 via the antenna 203 can be output through the earphone 201.

When the user who has received a sound through the earphone 201 manipulates the microphone switch 204 to an "ON" state, the microcomputer 241 serves to code the "ON" signal of the microphone switch 204 and a voice sound obtained from the microphone 202 to thereby transmit same to the body 100 via the transceiver 252 and the antenna 203 and simultaneously, to control the transceiver 252 in order to reproduce the sound signal received from the transceiver 252 via the earphone, so that two-way relay radio communication can be realized.

Furthermore, when the touch switch 230 is turned off, the microcomputer 241 serves to code the "OFF" signal of the touch switch 230 to thereafter transmit same to the body 100 via the transceiver 252 and the antenna 203 and to maintain only a receiving function of the transceiver 252 so that the transmission of sound can be possible via the microphone at the body 100.

The solar battery 221 is connected to the power source apparatus 220 by way of the diode 222, so that it can be used as an auxiliary power source of the radio handset 200.

Figure 9:
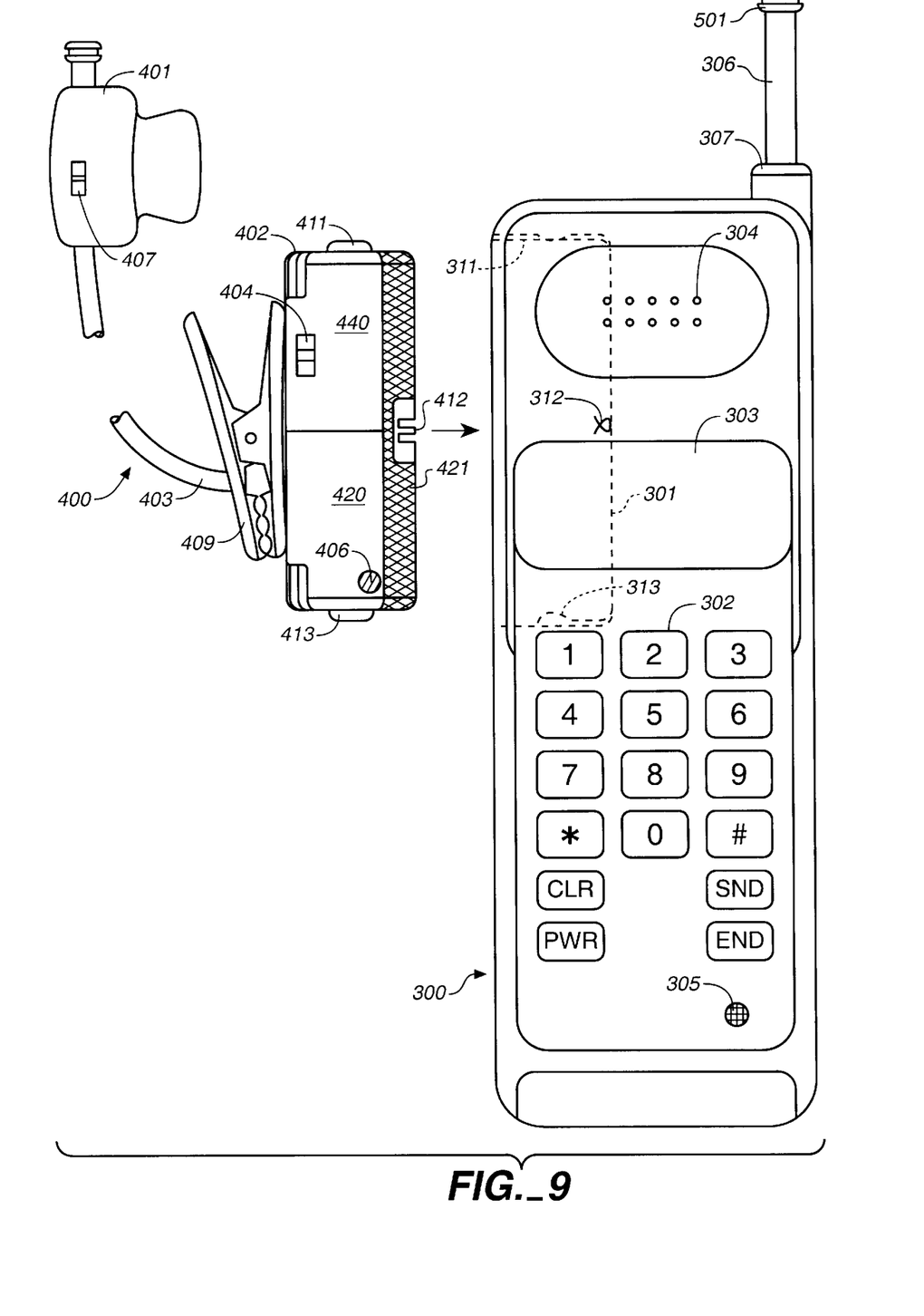
FIG. 9 is an external view of a mobile cellular phone according to a second embodiment of the present invention.
Figure 10:
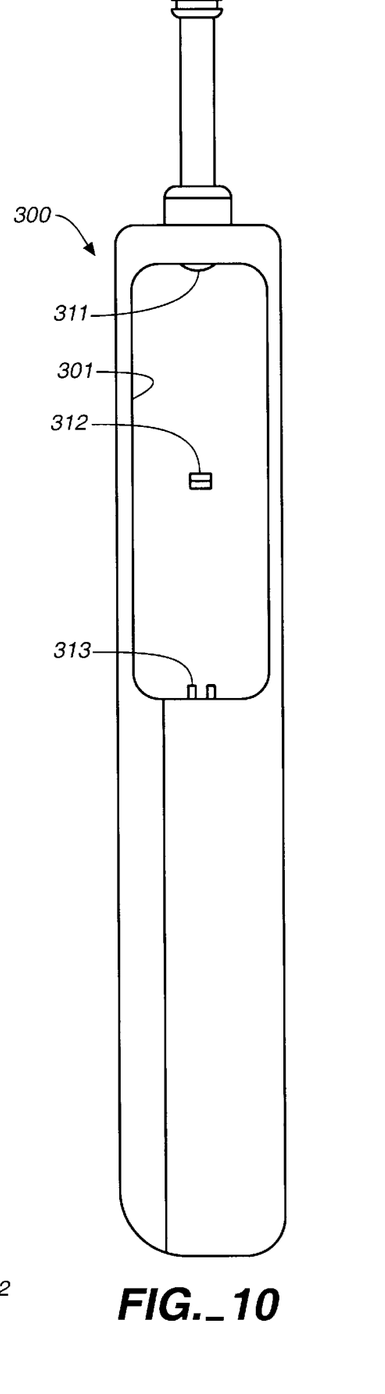
FIG. 10 is an external view of a mobile cellular phone body in a mobile cellular phone according to the second embodiment of the present invention.
Figure 11:
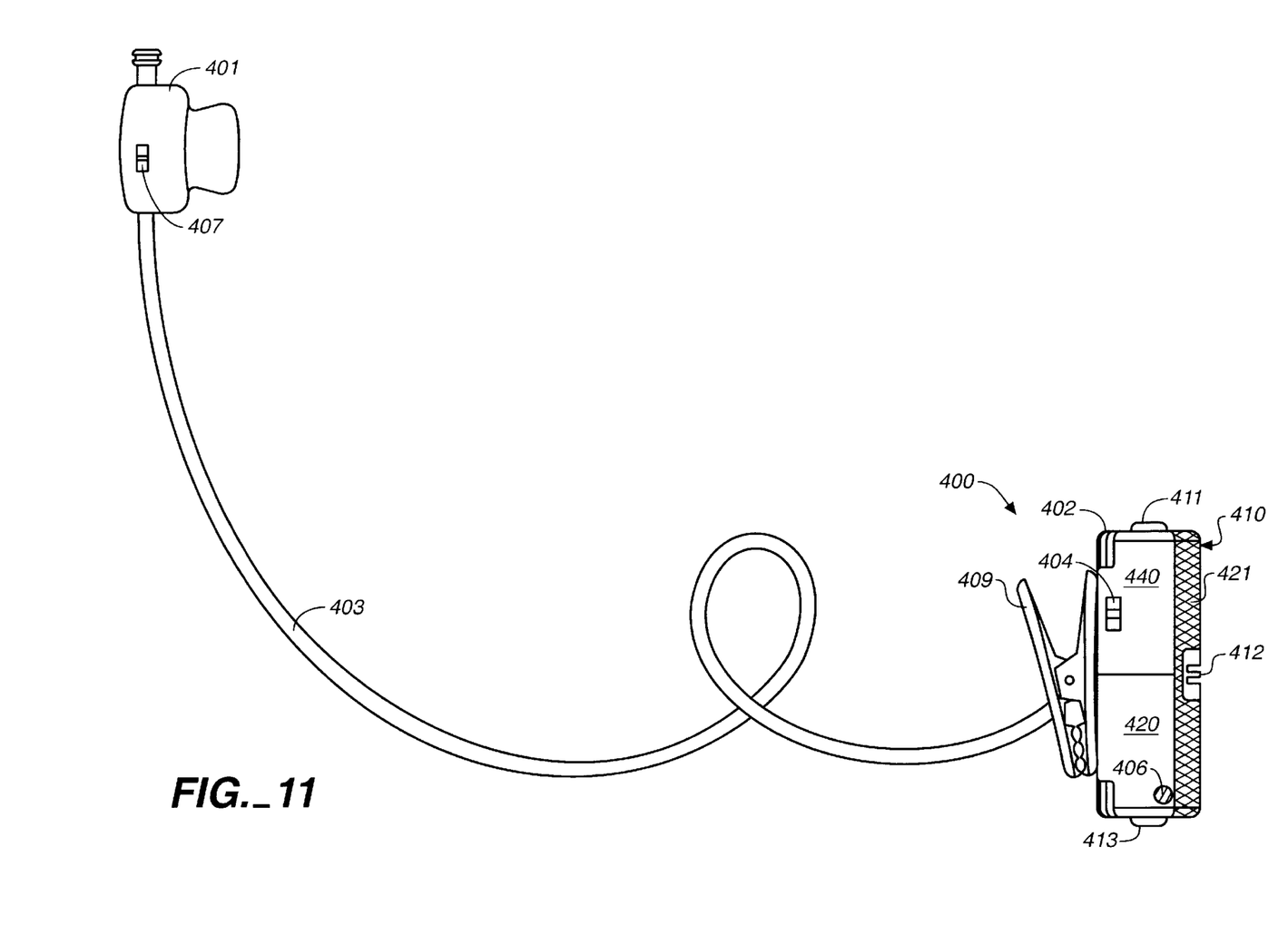
FIG. 11 is an external view of a radio handset in a mobile cellular phone according to the second embodiment of the present invention.
Figure 12:
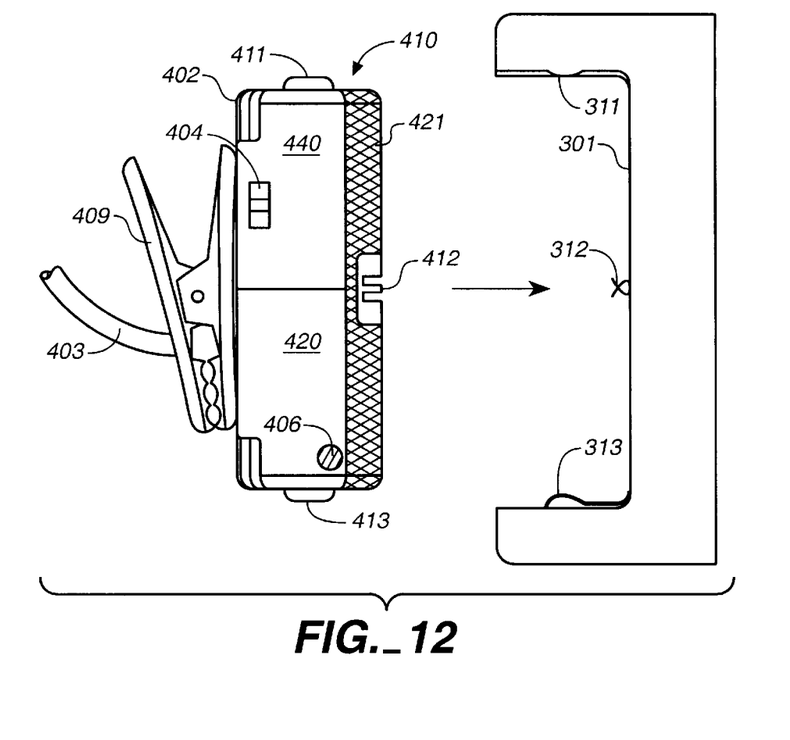
FIG. 12 is schematic diagram of terminals at a holder disposed at the mobile cellular phone body and at a radio handset of a mobile cellular phone according to the second embodiment of the present invention.

Meanwhile, FIG. 9 is an external view of a mobile cellular phone according to a second embodiment of the present invention, and FIG. 10 is an side view of a mobile cellular phone body in a mobile cellular phone according to the second embodiment of the present invention, FIG. 11 is an external view of a radio handset in the mobile cellular phone according to the second embodiment of the present invention and FIG. 12 is a block diagram of terminals at a holder formed in the mobile cellular phone body and a radio handset body in a mobile cellular phone according to the second embodiment of the present invention.

The mobile cellular phone according to the second embodiment of the present invention includes a radio handset 400 and a mobile cellular phone body 300 (hereinafter referred to as body) formed thereat with a holder 301 for accommodating the radio handset 400.

When the radio handset 400 is detached from the holder 301, the body 301 serves to relay a sound and a signal information in between the radio handset 400 and the base station to thereby enable a telecommunication via the radio handset 400, and when the radio handset 400 is accommodated in the holder 301, the telecommunication is possible through the body 300.

In FIG. 9, reference numeral 302 is a key pad, 303 a displayer, 304 a speaker, 305 a microphone, 306 an antenna, 307 a light emitting lamp and 501 is a light emitting body.

Furthermore, the radio handset 400 according to the present invention includes an earphone 401 for being accommodated in an ear of a user, a radio handset body 410 for being attached to a collar of a coat via a clip 409, a lead wire 403 for connecting the earphone 401 to the radio handset body 410, a control apparatus 440 for controlling an operation of the radio handset 400 and a power source apparatus for supplying a power necessary for driving the radio handset 400.

The radio handset body 410 is equipped at an external side thereof with a micro switch 404 for manipulating the radio handset 400 to a stand-by state or an engaged state, and a solar battery 421 for being used as an auxiliary power source of the power source 420.

The earphone 401 is arranged at an external side thereof with an earphone switch 407 for maintaining only a receiving function of the radio handset 400 so as to enable the telecommunication via the body 300.

The holder 301 formed at the body 300 is provided with a power terminal 311, a control terminal 312 and a ground terminal 313 respectively.

When radio handset body 410 is accommodated in the holder 301, the power terminal 311, the control terminal 312 and the ground terminal 313 formed at the holder 301 are respectively connected to a power terminal 411, a control terminal 412 and a ground terminal 413 formed at the holder 301.

In other words, the body 300, power terminals 311 and 411 of the radio handset 400, control terminals 312 and 412, ground terminals 313 and 413 are shortcircuited when the radio handset 400 is accommodated in the holder 301, and are opened when radio handset 400 is detached form the holder 301.

The control terminal 312 of the holder 301 has a spring clip shape so that it is resiliently connected to the control terminal 412 of the radio handset 400 when the radio handset 400 is accommodated in the holder 301, to thereby support the radio handset 400.

Figure 13:
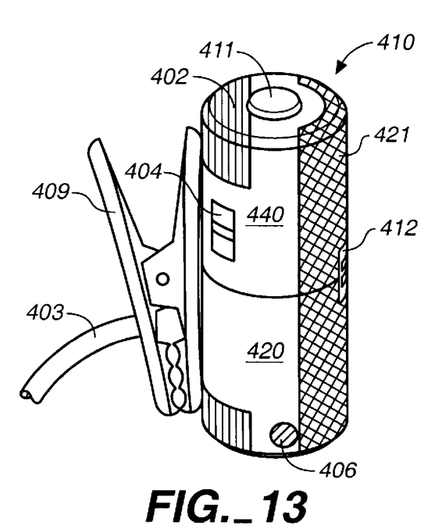
FIG. 13 of a perspective view of a first embodiment of a radio handset body in a mobile cellular phone according to the second embodiment of the present invention.

FIG. 13 is a perspective view for the first embodiment of a radio handset body in a mobile cellular phone according to the second embodiment of the present invention, where the radio handset body 410 is shaped in a cylindrical style.

Figure 14:
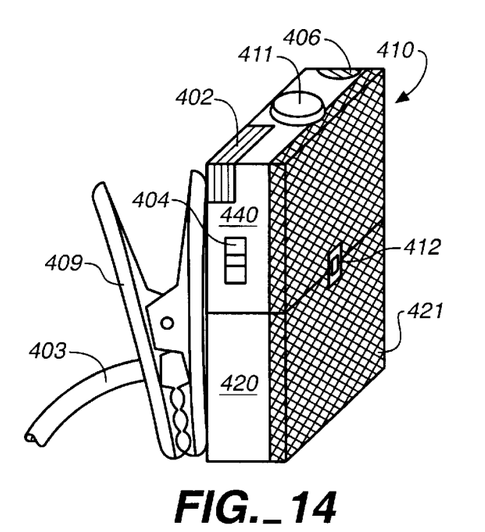
FIG. 14 is a perspective view of a second embodiment of a radio handset body in mobile cellular phone according to the second embodiment of the present invention.

FIG. 14 is a perspective view of a radio handset body in a mobile cellular phone according to the second embodiment of the present invention, where the body 410 is shaped in a hexahedral style.

Figure 15:
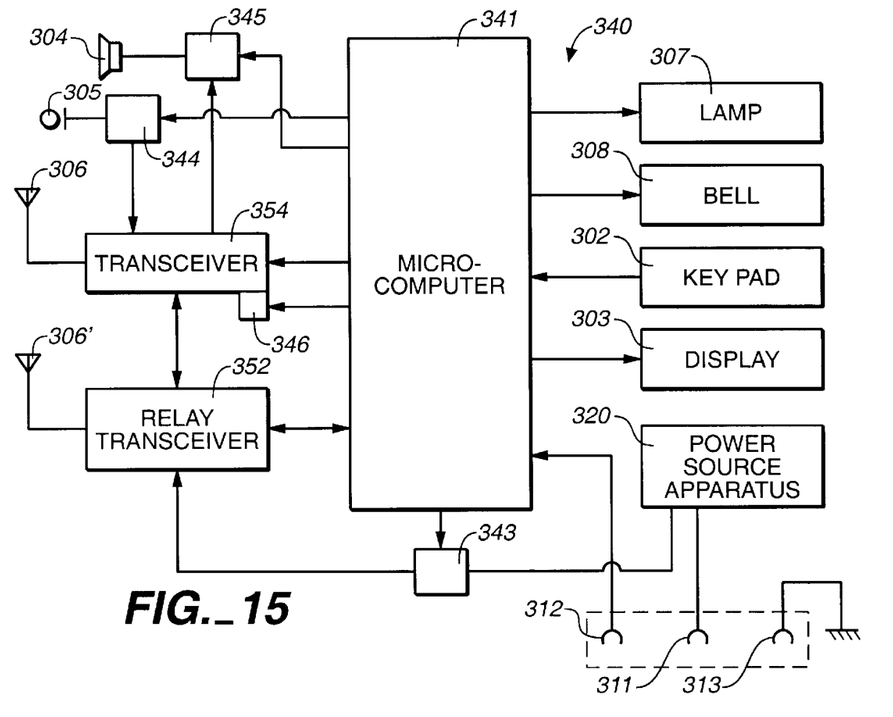
FIG. 15 is a schematic block diagram of a mobile cellular phone body in a mobile cellular phone according to the second embodiment of the present invention.

FIG. 15 is a schematic block diagram of a mobile cellular phone body 300 in a mobile cellular phone according to the second embodiment of the present invention, wherein the body 300 includes a key pad 302, a display 303, a speaker 304, microphone 305, antennas 306 and 306', a lamp 307, a bell 308, a power source apparatus 320, a control apparatus 340, a relay transceiver 352 and a transceiver 354.

The control apparatus 340 is provided with a microcomputer 341, a switch 343, a microphone switch 344, a speaker switch 345 and a hook switch 346.

The microcomputer 341 serves to turn off the switch 343 while the control terminal 312 is at an "ON" state to thereby stop the relay transceiver 352 and simultaneously to control the display 303, the light emitting lamp 307, the bell 308 the microphone switch 344, the speaker switch 345, the hook switch 346 and the transceiver 354 so that a telecommunication can be possible via the speaker 304 and the microphone 305 formed at the body 300.

Furthermore, the microcompter 341 is adapted to turn on the switch 343 while the control terminal 312 is at an "OFF" state to thereby drive the relay transceiver 352 so that a telecommunication can be possible via the radio handset 300, and simaltaneously to turn off the microphone switch 344 and the speaker switch 345 to prevent the telecommunication from being realized via the body 300.

The microcomputer 341 is so designed as to control a telecommunicative state according to various control signals provided from the radio handset 400 through the antenna 306' and the relay transceiver 352.

Figure 16:
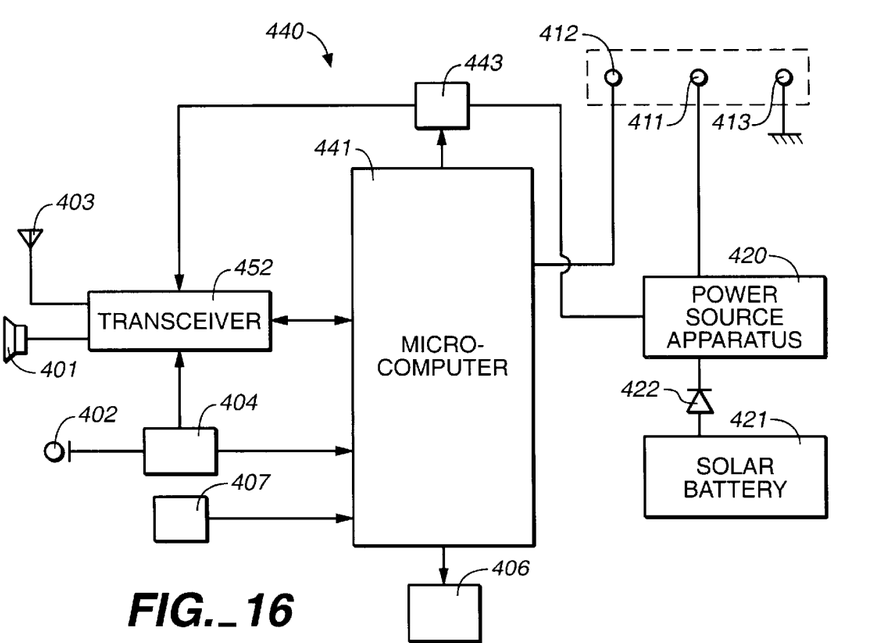
FIG. 16 is a schematic block diagram of a radio handset in a mobile cellular phone according to the second embodiment.

FIG. 16 is a schematic block diagram of a radio handset in a mobile cellular phone according to the second embodiment of the present invention, wherein the radio handset 400 includes an earphone 401, a microphone 402, an antenna 403 a buzzer 406, a power source apparatus 420, a solar battery 421, a diode 422, a control apparatus 440 and a transceiver 452.

The control apparatus 440 is formed with a microphone switch 404, and earphone switch 407, a microcomputer 441 and a switch 443.

The microcomputer 441 serves to turn on the switch 443 while the control terminal 412 is at an "OFF" state, to thereby drive the transceiver 452 so that a signal sound received by the transceiver 452 from the body 300 through the antenna 403 can be output via the earphone 401.

Furthermore, when a user who has received the signal sound via the earphone 401 manipulates the microphone switch 404 to an "ON" state, the microcomputer 441 serves to code the sound signal obtained from the microphone 402 and the "ON"signal of the microphone switch 404 to thereby transmit same to the body 300 via the transceiver 452 and the antenna 403 and at the same time to reproduce the sound signal received at the transceiver 452 through the earphone 401, to thereby enable a two-way relay radio telecommunication.

When the earphone switch 407 is turned on, the microcomputer 441 serves to code the "ON" signal of the earphone switch 407 to thereafter transmit same to the body 300 via the transceiver 452 and the antenna 403 and to maintain only a receiving function of the transceiver 452 so that a telecommunication can be possible via the microphone 305 at the body 300.

The solar battery 421 is connected to the power source apparatus 420 by way of the diode 422 so that it can be used as an auxiliary power source of the radio handset 400.

Now, an operational effect of the mobile cellular phone thus constructed according to the present invention will be described in detail.

In the mobile cellular phone according to the first embodiment of the present invention, when a user accommodates the radio handset 200 into the holder 101 formed at the body 100, the power source terminal 211 of the radio handset 200, the control terminal 212 and the ground terminal 213 are respectively connected to the power source terminal 111 of the ring-type clip 110 at the holder 101, control terminal 112 and to the ground terminal 113.

When the holder 101 and the power source terminals 111 and 211 of the radio handset 200 are respectively connected as described in the above, the power source apparatus 220 of the radio handset 200 receives a power source from the power source apparatus 120 of the body to thereafter be charged.

When the holder 101 and the control terminals 112 and 212 of the radio handset 200 are mutually connected, the microcomputer 241 of the radio handset 200 serves to turn off the switch 243 to stop the transceiver 252 and the microcomputer 141 at the body 100 serves to turn off the switch 143 to stop the relay transceiver 152 and simulta-neously to turn on the microphone switch 144 and the speaker switch 145 to enable a telecommunication via the speaker 104 of the body 100 and the microphone 105.

Meanwhile, the radio handset 200 is separated from the holder 101 at the body 100, the power source terminal 211 of the radio handset 200, the control terminal 212 and the ground terminal 213 are respectively detached from the power source terminal 111 formed at the ring-type clip 110 of the holder 101, the control teminal 112 and the ground terminal 113.

When the control terminal 212 of the radio handset 200 is separated from the control terminal 112 of the holder 101, the microcomputer 141 at the body 100 serves to turn on the switch 143 to drive the relay transceiver 152, and the microcomputer 241 of the radio handset 200 turns on the switch 243 to thereby drive the transceiver 252.

Furthermore, when the radio handset 200 is detached from the holder 101 formed at the body 100, the microcomputer 141 of the body 100 serves to turn on the switch 143 to drive the relay transceiver 152 and simultaneously to turn off the speaker switch 145 and the microphone switch 144 to thereby deactivate the speaker 104 and the microphone 105.

Under these circumstances, the received signal sound is provided to the radio handset 200 via the relay transceiver 152, and because the transceiver 252 of the radio handset 200 is under driving condition, the received signal sound transmitted from the relay transceiver 152 of the body 100 is received by the transceiver 252 of the radio handset 200 to thereafter be output to the earphone 201.

At this time, because the earphone 201 is supposed to be inserted into an ear, the user can listen to the received sound signal from the earphone 201 worn at the ear.

When the user who has received the signal sound manipulates to turn on the microphone switch 204, the microcomputer 241 serves to code the sound signal obtained through the microphone 202 and the "ON" signal of the microphone switch 204 to transmit same to the relay transceiver 152 at the body 100 via the transceiver 252 and the antenna 203, and when a signal is received from the relay transceiver 152 that the microphone switch 204 of the radio handset 200 has been turned on the microcomputer 141 at the body 100 serves to turn on the switch 146 to thereby enable a two-way telecommunication.

Meanwhile, when the touch switch 230 is turned off, the microcomputer 241 codes and transmits same to the relay transceiver 152 via the transceiver 252 to thereby maintain only a receiving function of the transceiver 252.

When a signal is input from the relay transceiver 152 that the touch switch 230 is "OFF", the microcomputer 141 at the body 100 so controls that the relay transceiver 152 can transmit only the signal sound received at the transceiver 154 to the radio handset 200 via the antenna 106' and turns on the microphone switch 144 to thereby enable the sound to be input through the microphone 105 of the body 100.

At this time, the touch switch 230 is controlled to maintain an "OFF" state while the antenna 203 is tucked in.

Successively, when the user detaches the radio handset 200 from the holder 101 of the body 100 and puts the earphone 201 to his ear while the antenna 203 is tucked in and because the touch switch 230 maintains an "OFF"state, the user receives the sound signal through the earphone 201 of the radio handset and transmits the sound signal via the microphone 105 of the body 100.

When the user detaches the radio handset 100 from the holder 101 of the body 100, and puts same to his ear while the antenna 203 is unfolded and because the touch switch 230 maintains an "ON" state, a telecommunication can be possible via the earphone 201 of the radio handset 200 and the microphone 202.

Accordingly, the telecommunication is possible both by the radio handset 200 at a hands-free state and by the body 100.

Futhermore, an easy handcarry is possible because the radio handset 200 can be accommodated into the holder 101 formed at the body 100.

Meanwhile, in the mobile cellular phone according to the second embodiment of the present invention, when the user accommodates the radio handset 400 in the holder 301 formed at the body 300, the power source terminal 411 of the radio handset 400, the control terminal 412 and the ground terminal 413 are respectively connected to the power source terminal 311 of the holder 301, the control terminal 312 and the ground terminal 313.

At this time, because the control terminal 312 of the holder has a spring clip shape, and when the radio handset 400 is accommodated into the holder 301, the control terminal formed at the body 410 is resiliently connected to the control terminal 312 of the holder 301 to thereby support the body 410.

Furthermore, when the radio handset 400 is accommodated into the holder 301, and when the holder 301 and the power source terminals 311 and 411 of the radio handset 400 are mutually connected, the power source apparatus 420 of the radio handset 400 receives the power from the power source apparatus of the body 320 to thereafter be charged.

When the holder 301 and the control terminals 312 and 412 of the radio handset 400 are interconnected,. the microcomputer 441 of the radio handset 400 turns off the switch 443 to thereby stop the transceiver 452 and the microcomputer 341 of the body 300 turns off the switch 343 to stop the relay transceiver 352 and simultaneously to turn on the microphone switch 344 and the speaker switch 345 so that a telecommunication via the speaker 304 of the body 300 and the microphone 305 is possible.

Meanwhile, when the radio handset 400 is detached from the holder 301 of the body 300, the power source terminal 411 of the radio handset 400, control terminal 412 and the ground terminal 413 are respectively detached from the power source terminal 311 of the holder 301, control terminal 312 and from the ground terminal 313.

When the control terminal 412 of the radio handset 400 is detached from the control terminal 312 of the holder 301, the microcomputer 341 of the body 300 turns on the switch 343 to thereby drive the relay transceiver 352 and the microcomputer 441 of the radio handset 400 turns on the switch 443 and drives the transceiver 452 to enable a telecommunication via the radio handset 400.

In other words, when the radio handset 400 is separated from the holder 301 formed at the body 300, the microcomputer 341 of the body 300 turns on the switch 343 to thereby drive the relay transceiver 352 and at the same time turns off the speaker switch 345 and the microphone switch 344 to deactivate the speaker 304 and the microphone 305.

Under these circumstances, the received signal sound is provided to the radio handset 400 via the relay transceiver 352.

Furthermore, when the radio handset 400 is detached form the holder 301, the microcomputer 441 of the radio handset 400 turns on the switch 443 to thereby drive the transceiver 452 and the signal sound received from the relay transceiver 352 at the body 300 is received by the transceiver 452 of the radio handset 400 and is output through the earphone 401.

At this time, because the body 410 can be worn at the user's collar of the coat and the earphone 401 can be inserted into an ear, the user can listen to the received sound signal from the earphone inserted into the ear.

When the user who has listened to the received sound signal manipulates the microphone switch 404 to be turned on, the microcomputer 441 codes the sound signal obtained via the microphone 402 and the "ON" signal of the microphone switch 404 and transmits same to the relay transceiver 352 of the body 300 via the transceiver 452 and the antenna 403.

The microcomputer 341 of the body 300 turns on the hook switch 346 to make it possible to perform a two-way telecommuniation when a signal is input from the relay transceiver 352 that the microphone switch of the radio handset 400 is turned on.

Meanwhile, when the earphone switch 407 is turned off, the microcomputer 441 codes the signal therefrom to thereby transmit same to the relay transceiver 352 of the body 300 via the transceiver 452 and to maintain only a receiving function of the transceiver 452.

When a signal is input from the relay transceiver 352 that the earphone switch 407 is turned off, the microcomputer 341 of the body 300 so controls that only the signal sound received by the transceiver 354 at the relay transceiver 352 is transmitted to the radio handset 400 via the antenna 306' and turns on the microphone switch 344 to make it possible to input the sound through the microphone 305 of the body 300.

In other words, when the user detaches the radio handset 400 from the holder 301 of the body 300 and puts the earphone 401 to his ear with the earphone switch 407 being turned off, a sound signal is received through the earphone 401 of the radio handset 400 and the sound signal is transmitted via the microphone 305 of the body 300.

Meanwhile, when the user detaches the radio handset 300 from the holder 301 of the body 300, puts the earphone 401 to his ear and turns on the earphone switch 407, a telecommunication can be made possible through the earphone 401 of the radio handset 400 and the microphone 402.

Accordingly, a telecommunication can be possible hands-free via the radio handset 400 and via the body 300.

Furthermore, an easy handcarry is possible because the radio handset can be accommodated into the body 300.

As apparent from the foregoing, there is an advantage in the present invention in that an additional radio handset can be installed at the mobile cellular phone to enable a use of the mobile cellular phone hands-free regardless of a place, and when a telecommunication is performed via the radio handset thus constructed, harmful electromagnetic waves generated from the mobile cellular phone can be prevented from being directly transmitted to human body.

Furthermore, there is another advantage, in that a received signal sound can be listened to via an earphone of the radio handset and, an accurate telecommunicative contents can be heard even at a noisy place and a microphone of the radio handset or a microphone of a mobile cellular phone body can be selectively used for the telecommunication depending on the place.

There is still another advantage in that an antenna is equipped at a lower housing thereof with a light emitting diode and at an upper end thereof with a light emitting body, so that, the mobile cellular phone can be easily found at a dark place. Power of the radio handset can be supplemented by a solar battery to thereby make up for a power shortage.

There is still further another advantage in that a hands-free mode can be automatically adjusted in the course of the radio handset being accommodated into the body or being detached therefrom so that it is very handy in using the product.

What is claimed is:

1. A mobile cellular phone, the mobile cellular phone comprising:

a radio handset; and a mobile cellular phone body formed thereon with a holder for accommodating the radio handset, wherein the radio handset and the body operate so that when the radio handset is detached from the holder, a telecommunication can be realized through the radio handset, and when the radio handset is accommodated in the holder the telecommunication can be realized through the body; and wherein the body comprises:

a transceiver having a speaker, a microphone, and an antenna which is in turn disposed with a light emitting diode at a lower housing thereof and a light emitting body at an upper end thereof and for transmitting and receiving from a base station a sound and a signal information via the antenna;

a relay transceiver for relaying the sound and the signal information between the transceiver and the radio handset;

a control apparatus for controlling the operation of the speaker, microphone, transceiver and the relay transceiver so that when the radio handset is detached from, the sound and the signal information can be relayed between the radio handset and the base station, and when the radio handset is accommodated in the holder, a telecommunication can be possible via the speaker and the microphone; and a power source apparatus for supplying a power necessary for driving the speaker, microphone, transceiver, relay transceiver, radio handset, and the control apparatus.

2. The mobile cellular phone as defined in claim 1, wherein the radio handset can be used hands-free when it is worn by a user.

3. The mobile cellular phone as defined in claim 2, wherein the radio handset comprises:

an antenna;

a microphone;

an earphone insertable into an ear of the user;

a transceiver for receiving via the antenna of radio handset a sound and a signal information transmitted via a radio channel from the body to thereby output same to the earphone, and for transmitting via the antenna of radio handset a sound information input through the microphone;

a control apparatus for controlling the operation of the microphone, earphone and the transceiver to thereby enable telecommunication via the earphone and the microphone when the radio handset is detached from the holder; and a power source apparatus for supplying power for driving the microphone; earphone, transceiver and the control apparatus.

4. The mobile cellular phone as defined in claim 2, wherein the radio handset comprises:

an earphone insertable into an ear of a user;

a radio handset body which can be worn on a collar of a user's coat;

a lead wire for electrically connecting the earphone and the radio handset body which further includes a microphone for inputting a user's sound;

a radio transceiver for receiving a sound and a signal information transmitted from the mobile cellular phone body to output same to the earphone via the lead wire and for transmitting the sound information input via the microphone to the mobile cellular phone body;

a control apparatus for controlling the operation of the radio transceiver; and a power source apparatus for supplying power for driving the radio handset transceiver.

5. The mobile cellular phone as defined in claim 3 or 4, wherein the earphone and the microphone are respectively connected to ends of an antenna of radio handset, and the antenna can be extended and tucked in so that depending on the state of the antenna, a distance between the earphone and the microphone can be adjusted.

6. The mobile cellular phone as defined in claim 3 or 4, wherein the power source apparatus can be charged by receiving power from a power source apparatus in the mobile cellular phone body through a power source terminal of the radio handset and a power source terminal of the mobile cellular phone body mutually connected when the radio handset is accommodated into the holder.

7. The mobile cellular phone as defined in claim 3 or 4, wherein the power source apparatus is disposed with a solar battery by which the apparatus can be charged.

8. The mobile cellular phone as defined in claim 3 or 4, wherein a power source terminal, a control terminal and a ground terminal, which are respectively formed at the radio handset and the holder, are interconnected when the radio handset is accommodated into the holder, wherein the control terminal formed at the holder is a spring clip, so that when the radio handset is accommodated into the holder, the control terminal of the radio handset is fixedly forced into the spring clip.

9. A mobile cellular phone, the mobile cellular phone comprising:

a radio handset; and a mobile cellular phone body formed thereon with a holder for accommodating the radio handset, wherein the radio handset and the body operate so that when the radio handset is detached from the holder, a telecommunication can be realized through the radio handset, and when the radio handset is accommodated in the holder, the telecommunication can be realized through the body, wherein the radio handset can be used hands-free when it is worn by a user; and wherein the radio handset comprises:

an antenna;

a microphone;

an earphone insertable into an ear of the user, wherein the earphone and the microphone of radio handset respectively connected to ends of the antenna of radio handset, and the antenna can be extended and tucked in so that depending on the state of the antenna, a distance between the earphone and the microphone can be adjusted;

a transceiver for receiving via the antenna of radio handset a sound and a signal information transmitted via a radio channel from the body to thereby output same to the earphone, and for transmitting via the antenna of radio handset a sound information input through the microphone;

a control apparatus for controlling the operation of the microphone, earphone and the transceiver to thereby enable telecommunication via the earphone and the microphone when the radio handset is detached from the holder; and a power source apparatus for supplying power for driving the microphone; earphone, transceiver and the control apparatus.

10. The mobile cellular phone as defined in claim 9, wherein the body comprises:

a transceiver having a speaker, a microphone, and an antenna and for transmitting and receiving from a base station a sound and a signal information via the antenna;

a relay transceiver for relaying the sound and the signal information between the transceiver and the radio handset;

a control apparatus for controlling the operation of the speaker, microphone, transceiver and the relay transceiver so that when the radio handset is detached from, the sound and the signal information can be relayed between the radio handset and the base station, and when the radio handset is accommodated in the holder, a telecommunication can be possible via the speaker and the microphone; and a power source apparatus for supplying a power necessary for driving the speaker, microphone, transceiver, relay transceiver, radio handset, and the control apparatus.

11. The mobile cellular phone as defined in claim 10, wherein the antenna is disposed at a lower housing thereof with a light emitting diode and at an upper end thereof with a light emitting body.

12. The mobile cellular phone as defined in claim 9, wherein the radio handset comprises:

an earphone insertable into an ear of a user;

a radio handset body which can be worn on a collar of a user's coat;

a lead wire for electrically connecting the earphone and the radio handset body which further includes a microphone for inputting a user's sound;

a radio transceiver for receiving a sound and a signal information transmitted from the mobile cellular phone body to output same to the earphone via the lead wire and for transmitting the sound information input via the microphone to the mobile cellular phone body;

a control apparatus for controlling the operation of the radio transceiver; and a power source apparatus for supplying power for driving the radio handset transceiver.

13. The mobile cellular phone as defined in claim 9 or 12, wherein the power source apparatus can be charged by receiving power from a power source apparatus in the mobile cellular phone body through a power source terminal of the radio handset and a power source terminal of the mobile cellular phone body mutually connected when the radio handset is accommodated into the holder.

14. The mobile cellular phone as defined in claim 9 or 12, wherein the power source apparatus is disposed with a solar battery by which the apparatus can be charged.

15. The mobile cellular phone as defined in claim 9 or 12, wherein a power source terminal, a control terminal and a ground terminal, which are respectively formed at the radio handset and the holder, are interconnected when the radio handset is accommodated into the holder, wherein the control terminal formed at the holder is a spring clip, so that when the radio handset is accommodated into the holder, the control terminal of the radio handset is fixedly forced into the spring clip.

16. A mobile cellular phone, the mobile cellular phone comprising:

a radio handset; and a mobile cellular phone body formed thereon with a holder for accommodating the radio handset, wherein the radio handset and the body operate so that when the radio handset is detached from the holder, a telecommunication can be realized through the radio handset, and when the radio handset is accommodated in the holder the telecommunication can be realized through the body, wherein the radio handset can be used hands-free when it is worn by a user;

wherein the radio handset comprises:
an earphone insertable into an ear of a user;
a radio handset body which can be worn on a collar of a user's coat;
a lead wire for electrically connecting the earphone and the radio handset body which further includes a microphone for inputting a user's sound;
a radio transceiver for receiving a sound and a signal information transmitted from the mobile cellular phone body to output same to the earphone via the lead wire and for transmitting the sound information input via the microphone to the mobile cellular phone body;
a control apparatus for controlling the operation of the radio transceiver; and
a power source apparatus for supplying power for driving the radio handset transceiver; and wherein a power source terminal, a control terminal and a ground terminal, which are respectively formed at the radio handset and the holder, are interconnected when the radio handset is accommodated into the holder, wherein the control terminal formed at the holder is a spring clip, so that when the radio handset is accommodated into the holder, the control terminal of the radio handset is fixedly forced into the spring clip.

17. The mobile cellular phone as defined in claim 16, wherein the body comprises:

a transceiver having a speaker, a microphone, and an antenna and for transmitting and receiving from a base station a sound and a signal information via the antenna;

a relay transceiver for relaying the sound and the signal information between the transceiver and the radio handset;

a control apparatus for controlling the operation of the speaker, microphone, transceiver and the relay transceiver so that when the radio handset is detached from, the sound and the signal information can be relayed between the radio handset and the base station, and when the radio handset is accommodated in the holder, a telecommunication can be possible via the speaker and the microphone; and a power source apparatus for supplying a power necessary for driving the speaker, microphone, transceiver, relay transceiver, radio handset, and the control apparatus.

18. The mobile cellular phone as defined in claim 17, wherein the antenna is disposed at a lower housing thereof with a light emitting diode and at an upper end thereof with a light emitting body.

19. The mobile cellular phone as defined in claim 16, wherein the radio handset comprises:

an antenna;

a microphone;

an earphone insertable into an ear of the user;

a transceiver for receiving via the antenna of radio handset a sound and a signal information transmitted via a radio channel from the body to thereby output same to the earphone, and for transmitting via the antenna of radio handset a sound information input through the microphone;

a control apparatus for controlling the operation of the microphone, earphone and the transceiver to thereby enable telecommunication via the earphone and the microphone when the radio handset is detached from the holder; and a power source apparatus for supplying power for driving the microphone; earphone, transceiver and the control apparatus.

20. The mobile cellular phone as defined in claim 16 or 19, wherein the earphone and the microphone are respectively connected to ends of an antenna of radio handset, and the antenna can be extended and tucked in so that depending on the state of the antenna, a distance between the earphone and the microphone can be adjusted.

21. The mobile cellular phone as defined in claim 16 or 19, wherein the power source apparatus can be charged by receiving power from a power source apparatus in the mobile cellular phone body through a power source terminal of the radio handset and a power source terminal of the mobile cellular phone body mutually connected when the radio handset is accommodated into the holder.

22. The mobile cellular phone as defined in claim 16 or 19, wherein the power source apparatus is disposed with a solar battery by which the apparatus can be charged.

* * * * *